July 15, 1958     J. H. FOLWELL ET AL     2,842,883
PAPER MOUNT FOR TRANSPARENCIES
Filed May 10, 1956
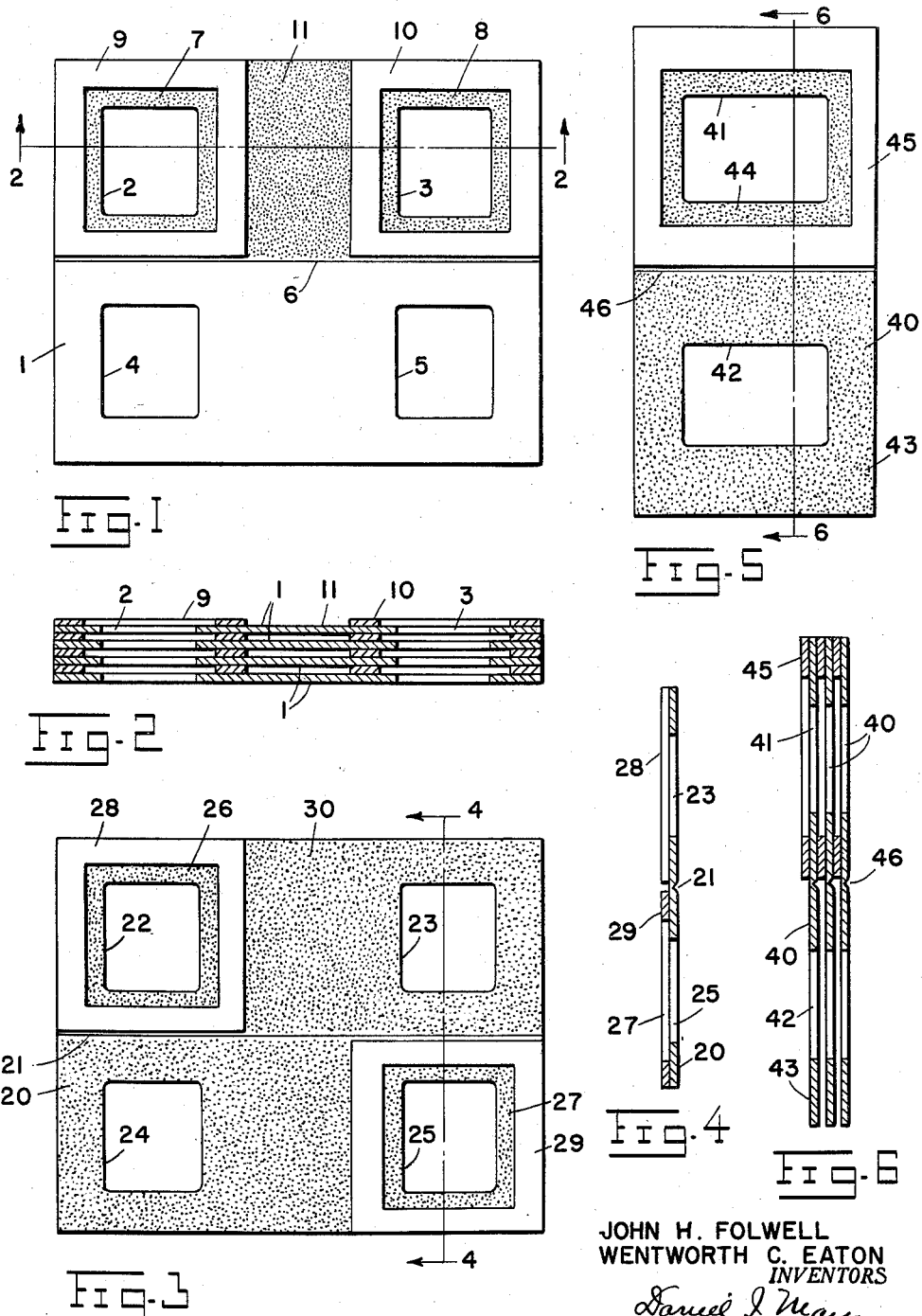
JOHN H. FOLWELL
WENTWORTH C. EATON
      *INVENTORS*
BY
*ATTORNEYS.*

United States Patent Office 2,842,883
Patented July 15, 1958

2,842,883

PAPER MOUNT FOR TRANSPARENCIES

John H. Folwell and Wentworth C. Eaton, Rochester, N. Y., assignors to Eastman Kodak Company, Rochester, N. Y., a corporation of New Jersey Application May 10, 1956, Serial No. 584,046

4 Claims. (Cl. 40—158)

This invention relates to photography and more particularly to inexpensive mounts for photographic positives or transparencies for projection purposes.

At the present time a large number of transparency slides are being made and in order to make such transparencies useable at relatively low costs, it is necessary to mount the bulk of these slides in mounts made of inexpensive material such as cardboard or paper. Much of the actual mounting of the transparencies in the paper mounts is done by automatic machinery and at high speed. While satisfactory results are readily obtainable with the automatic machines such as those now on the market for this purpose, there are occasional difficulties in which the transparencies are improperly positioned or held in the mounts. It has been found that most of these difficulties occur due to the feed of the unfolded mounts from a hopper or the like to a loading station in the machine and occasionally imperfect adherence is obtained after the mounts are folded. In such mounting machines the unfolded mounts are moved one at a time, the transparencies are placed in the mounts, the mounts are folded and carefully heated around the edge portions only to seal the mounts with the transparencies in place. With color slides it is particularly necessary to prevent overheating the slide itself and thus possibly spoiling the color.

It has been discovered that most, if not all, hopper feed difficulties occur because of occasional premature adherence of certain portions of the thermoplastic adhesive on one side of the mount to an unfolded mount adjacent to it. These difficulties generally only may occur intermittently and it is presumed that they are probably caused by certain atmospheric conditions in which the thermoplastic material of certain mounts which may lie against portions of an adjacent mount are prematurely activated or become tacky causing momentary or partial adherence between two different mounts and preventing the successful automatic feed of each mount in turn.

Not only does the feed of these mounts sometime fail, presumably for the reasons given above, but in certain instances, even with the use of considerable heat and pressure, perfect adherence is not always obtained to hold the transparency in its mount. This is believed to be caused because in many cases the heat must pass through an air layer and since air is a good insulator, it is difficult to always press the two portions of the mount which must be adhered together and evenly heat through this air layer.

It is an object of this invention to overcome the above difficulties. Another object of the invention is to provide a mount with a means for spacing the thermoplastic adhesive of one mount from the next adjacent mount to prevent premature adhesions before the slides are moved from a hopper or the like into a loading position. Still another object of the invention is to provide a mount which is constructed in such a manner that heat may be readily conveyed through the mount to an adhesive rendering the adhesive evenly tacky without requiring the heat to pass through an air layer before contacting with the adhesive. Other objects will appear from the following specification, the novel features being pointed out in the claims at the end thereof.

Coming now to the drawings in which like reference characters denote like parts throughout, Fig. 1 is a top plan view of a stereo mount constructed in accordance with and embodying a preferred embodiment of our invention and showing a mount in its unfolded position before a transparency has been mounted therein;

Fig. 2 is a section taken on line 2—2 of Fig. 1 illustrating a series of these flat unfolded mounts lying one on the other as may occur in packages of mounts as they are sold or as may occur in a hopper of a machine for utilizing such mounts;

Fig. 3 is a top plan view of a different embodiment of our invention but also showing a stereo mount with the transparency locating frames differently arranged from that shown in Fig. 1;

Fig. 4 is a section on line 4—4 of Fig. 3;

Fig. 5 is a top plan view of an unfolded single transparency mount constructed in accordance with our invention; and Fig. 6 is a section taken on line 6—6 of Fig. 5 before a film is mounted with the mounts lying one on top of the other.

In the above drawings the thicknesses of the materials have been intentionally shown on an enlarged scale to better illustrate the invention. Actually the mounts may be made of a paper or cardboard support of approximately .018" thickness and there may be kraft paper locating frames of approximately .007" thickness carried by the cardboard portions of the mounts as will be hereinafter more fully described. The figures may be varied widely and it is understood they are merely given by way of example.

Referring particularly to Fig. 1, the mount 1 may consist of a generally rectangular cardboard support having apertures 2, 3, 4 and 5 formed therein. These apertures are so spaced that when the mount is folded along a weakened line 6, the apertures 2 and 4 and 3 and 5 will be automatically registered to frame a transparency lying in a transparency seat 7 or 8. The transparencies are located in these seats by means of frames 9 and 10 which are preferably formed from kraft paper. An adhesive which is preferably a heat and pressure-sensitive adhesive 11 is coated over the upper half of the stereo mount shown in Fig. 1 and this adhesive may be used to hold the kraft frames 9 and 10 in place.

As indicated in Fig. 2, these mounts are ordinarily stacked together either in a shipping carton or in a machine hopper with a series of the mounts lying one on the other. It will be noticed from Fig. 1 that the adhesive area 11 is coated on the thinnest portion of the mask or mount and that the kraft paper frames 9 and 10 project upwardly from the heat and pressure-sensitive adhesive 11 between thickness of the material. This material may be approximately .007" thick and such a spacing is sufficient to space the adhesive areas 11 from the thicker support 1 of the next adjacent mount, as indicated in Fig. 2. Thus, even if these adhesive areas should become tacky due to atmospheric conditions or otherwise, there would be no tendency on the part of one adhesive area to stick to the next adjacent mount so that they will slide at all times without premature adhesion.

In addition, it should be noted that since the adhesive areas 11 lie directly on the surface of the cardboard 1 when transparencies are placed in the seats 7 and 8 against this adhesive area and when the mounts are folded up, heat will only have to be passed through the thickness of the cardboard mount 1 which may be in the order of .018″ so that this layer of adhesive will be evenly heated and will adhere when the mount is folded along the weakened line 6 and put in a press with heat and pressure aplied to the outer uncoated surface of the cardboard 1. Thus, there is no layer of air (which forms a good heat insulating layer) to tend to prevent good adherence between the mount parts when folded together with a transparency therebetween.

In a second embodiment of our invention shown in Figs. 3 and 4 the cardboard base 20 of the mount is provided with the usual weakened line 21 for folding between the upper and lower sections. The card is provided with apertures 22, 23, 24 and 25, apertures 22 and 24 and 23 and 25 being adapted to register when the card is folded after placing the transparencies in their respective seats, which in this case are the seats 26 and 27 which are formed by the kraft paper frames 28 and 29. These frames are attached by heat and pressure to the adhesive layer 30 which in this case extends over the entire card. However, it will be noted from Fig. 4 that the frames 28 and 29 form spacers to hold the adhesive-coated area 30 away from the next adjacent mount when these cards are stacked together for shipping or for use in automatic machines. Thus, there is no tendency for adherence even though the heat and pressure-sensitive layer 30 may become prematurely tacky.

Figs. 5 and 6 show an additional embodiment of our invention, in this case a single transparency holder. This holder consists of a cardboard piece 40 having apertures 41 and 42 punched therein and being coated with the heat and pressure-sensitive adhesive over the entire inner surface at 43 and 44, the latter forming a seat for the transparency since it is surrounded by a kraft frame 45. This frame may be caused to adhere to the mount by heat and pressure and, therefore, being attached to the adhesive surface 11, it extends out from the cardboard piece 40 to such an extent that a series of these mounts lying one on the other, as shown in Fig. 6, will be held from contact with the exposed heat and pressure-sensitive adhesive-coated areas 43 and 44, and consequently, here again there is no tendency for the mounts to prematurely stick together. Here again, the adhesive is coated directly on the cardboard 40 and heat will be transmitted directly through the cardboard by a suitable heating element to seal the mount together after folding upon the weakened line 46.

It is generally preferable in transparency mounts to provide the mating apertures of a slightly different size even though the two apertures may register when the mount is folded. The reason for this is that if one aperture is very slightly larger than the other, say perhaps .015 or .020, one of the apertures does the entire framing of the picture and a neater job can be done in this manner than when two frames have to be made to register with great accuracy during the folding operation.

While we have shown a number of different preferred forms of our invention and forms which have proved satisfactory for commercial use because they overcome the difficulties pointed out above, it is obvious that other modifications may readily occur to one skilled in the art. We consider as within the scope of our application any such forms as may come within the scope of the appended claims.

Having thus described our invention, what we claim as new and desire to secure by Letters Patent of the United States is:

1. A mount for transparencies comprising a pair of frame members adapted to be folded into overlapping relation, each frame member including registering light-transmitting apertures and at least one frame member carrying a layer of adhesive susceptible to heat and pressure, a film-locating frame carried by one frame member attached to the layer of heat and pressure-sensitive adhesive to form a film locating frame about one of the light-transmitting apertures, the film-locating frame being adapted to project by the thickness of the material from the heat and pressure-sensitive adhesive whereby the film-locating frame may serve to separate the heat and pressure-sensitive adhesive of a plurality of unfolded mounts stacked up for use to pervent the heat and pressure-sensitive adhesive of one mount from prematurely contacting with the next adjacent mount.

2. A transparency mount blank comprising a flat card having spaced apertures adapted to be folded into registration to frame a transparency, said blank lying in a plane and including a layer of thermoplastic adhesive positioned on one side thereof extending around at least one aperture, a locating frame attached to the thermoplastic adhesive of the flat card but otherwise free from adhesive, said locating frame extending around at least one aperture and being larger than the aperture to provide a transparency receiving recess to locate a transparency on the blank, said locating frame having a thickness in the order of the thickness of the transparency and projecting from the thermoplastic adhesive carried by the blank whereby the adhesively-coated sides of unfolded flat blanks may be spaced from the next adjacent blank by the thickness of the locating frame to prevent premature sticking therebetween.

3. A transparency mount blank comprising a flat card having spaced apertures adapted to be registered by folding the card to hold a transparency therebetween, a thermoplastic adhesive coated on one side of the card, a transparency-locating frame attached to the thermoplastic cement and extending around one aperture in the card and spaced from the aperture to form a transparency locating seat, the outer surface of the locating frame projecting from the face of the card and being free from adhesive whereby said transparency-locating frame may space the adhesive coated surface of the unfolded card from a next adjacent card to prevent premature sticking therebetween.

4. A transparency mount blank comprising a flat card lying in a plane and having a fold line and two apertures, one on each side of the fold line adapted to move into registration when the card is bent about the fold line, said blank including a layer of thermoplastic adhesive on one side thereof, the other side being free from adhesive, a locating frame of material having a thickness and attached to the thermoplastic adhesive of the mount and extending about an aperture but otherwise free from the thermoplastic adhesive to leave a seat for receiving a transparency on the mount covered with thermoplastic adhesive so that the seat may locate and hold the transparency over the aperture, the locating frame having an area free from adhesive spaced from the transparency mount and its adhesive by the thickness of the locating frame whereby said area of the locating frame free from adhesive and the side of the blank free from adhesive may space unfolded blanks one from another to prevent premature sticking therebetween.

References Cited in the file of this patent

UNITED STATES PATENTS

| | | |
|---|---|---|
| 682,063 | Haberstroh | Sept. 3, 1901 |
| 1,467,108 | Hodgson | Sept. 4, 1923 |
| 2,170,147 | Lane | Aug. 22, 1939 |
| 2,184,007 | Staehle | Dec. 19, 1939 |
| 2,495,142 | Seary | Jan. 17, 1950 |
| 2,571,764 | Rodger et al. | Oct. 16, 1951 |